United States Patent [19]

Newman

[11] Patent Number: 5,435,270

[45] Date of Patent: Jul. 25, 1995

[54] WALL MOUNTED AQUARIUM WITH INTEGRAL TANK

[76] Inventor: Stuart G. Newman, 713 N. Seventh St., St. Charles, Mo. 63301

[21] Appl. No.: 199,702

[22] Filed: Feb. 22, 1994

[51] Int. Cl.⁶ .............................................. A01K 63/06
[52] U.S. Cl. ................................. 119/257; 119/266; 119/269
[58] Field of Search ................ 119/257, 261, 262, 263, 119/265, 266, 267, 269, 256, 253; 40/160; 434/297, 296, 295; 248/213.2, 220.3, 311.2

[56] References Cited

U.S. PATENT DOCUMENTS

| | | | |
|---|---|---|---|
| 1,777,944 | 10/1930 | Trovato | 119/257 |
| 1,991,683 | 2/1935 | Kelly | 119/253 |
| 3,735,738 | 5/1973 | Lake . | |
| 4,136,638 | 1/1979 | Fedor | 119/257 |
| 4,151,810 | 5/1979 | Wiggins | 119/262 |
| 4,312,886 | 1/1982 | Bianco | 248/220.3 |
| 4,353,327 | 10/1982 | Shroyer . | |
| 4,894,151 | 1/1990 | Woltmann | 119/259 |
| 5,090,358 | 2/1992 | Waldman | 119/256 |
| 5,167,392 | 12/1992 | Henricksen | 248/311.2 |

FOREIGN PATENT DOCUMENTS

| | | | |
|---|---|---|---|
| 2475357 | 8/1981 | France | 119/257 |
| 1433368 | 4/1976 | United Kingdom | 119/269 |

*Primary Examiner*—Gene Mancene
*Assistant Examiner*—Todd E. Manahan
*Attorney, Agent, or Firm*—Paul M. Denk

[57] ABSTRACT

A wall mounted aquarium includes an aquarium, a frame which holds the aquarium, and brackets which mount the frame to a wall. The frame has a bottom member, side members, and a top member. The bottom and side members are generally C-shaped to define a groove sized to receive the aquarium and are joined together to vertically and slideably receive the aquarium in the groove. The frame top fits over the aquarium. The wall brackets have openings which slidably receive downwardly and outwardly extending tabs from the frame side members to removably mount the frame and aquarium to a wall.

14 Claims, 4 Drawing Sheets

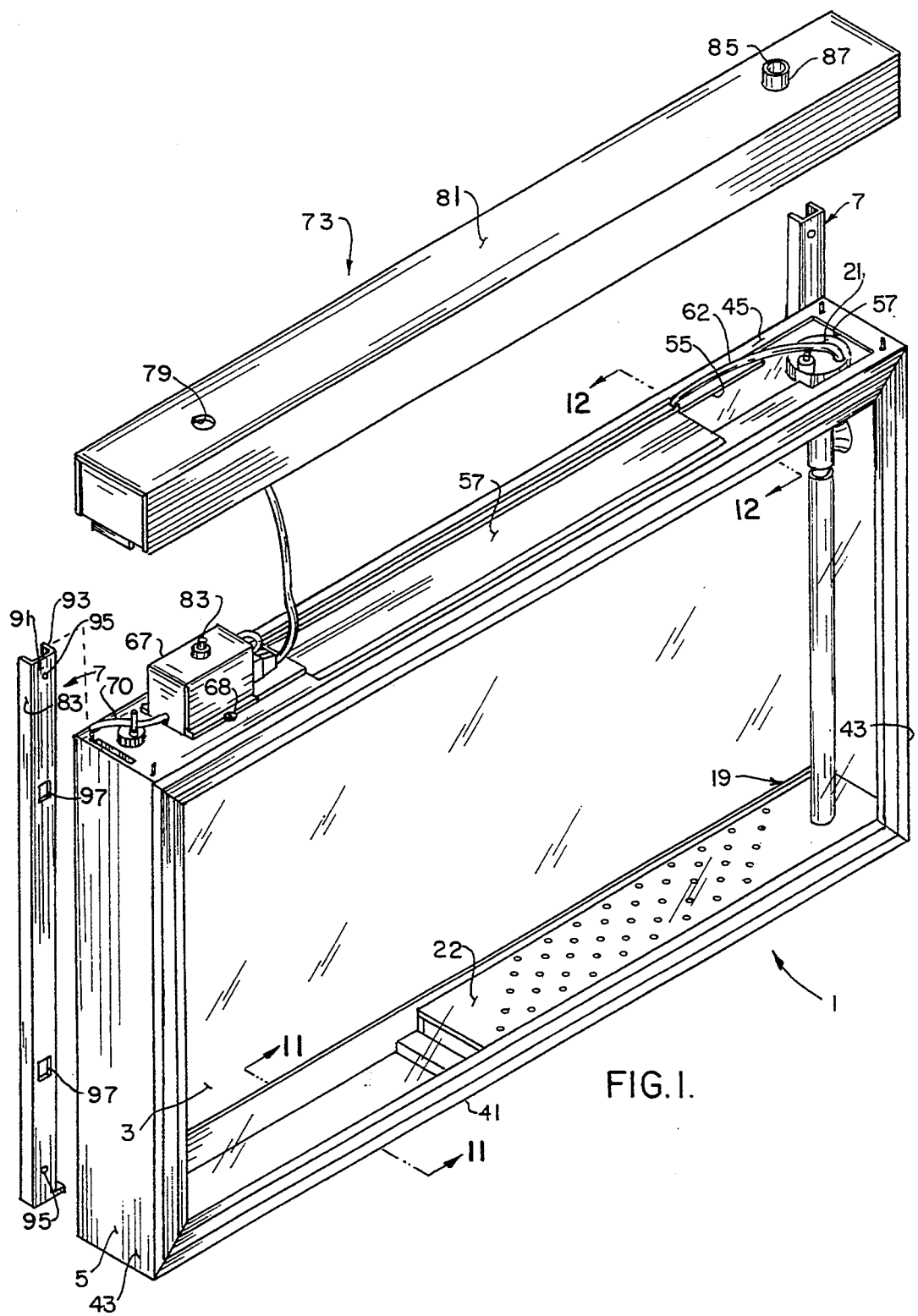

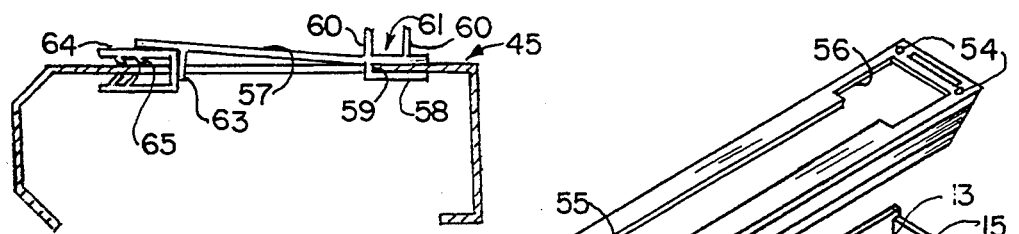
FIG.12.
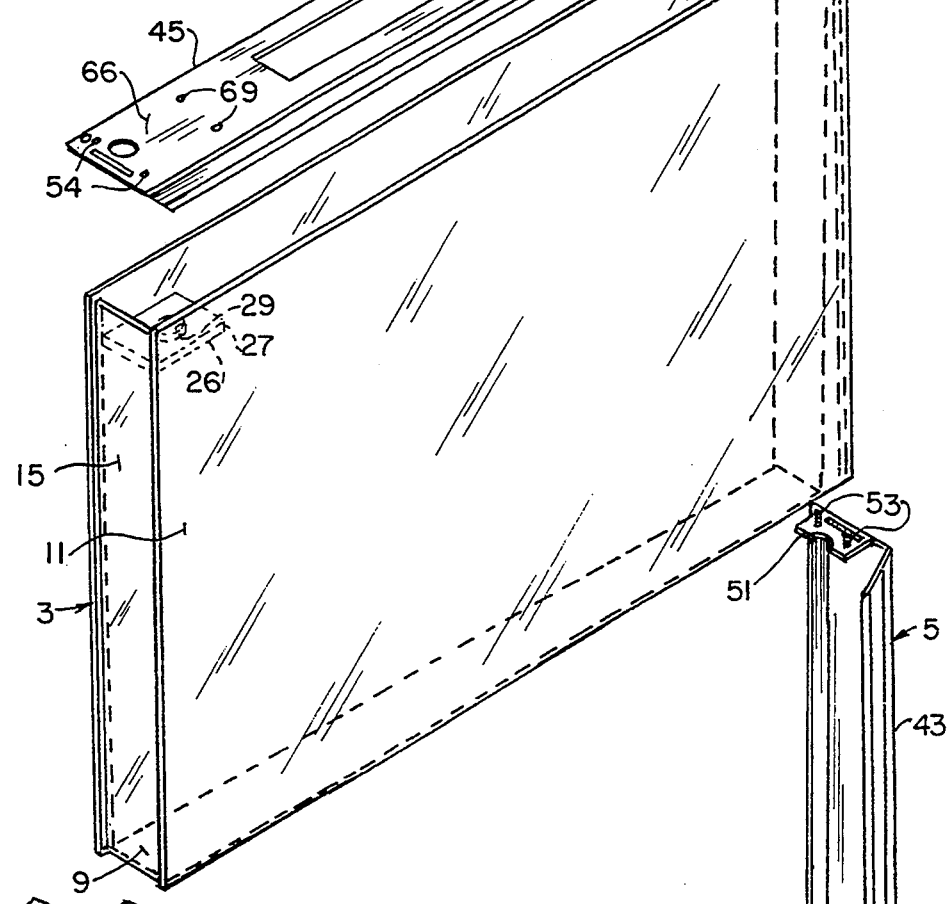
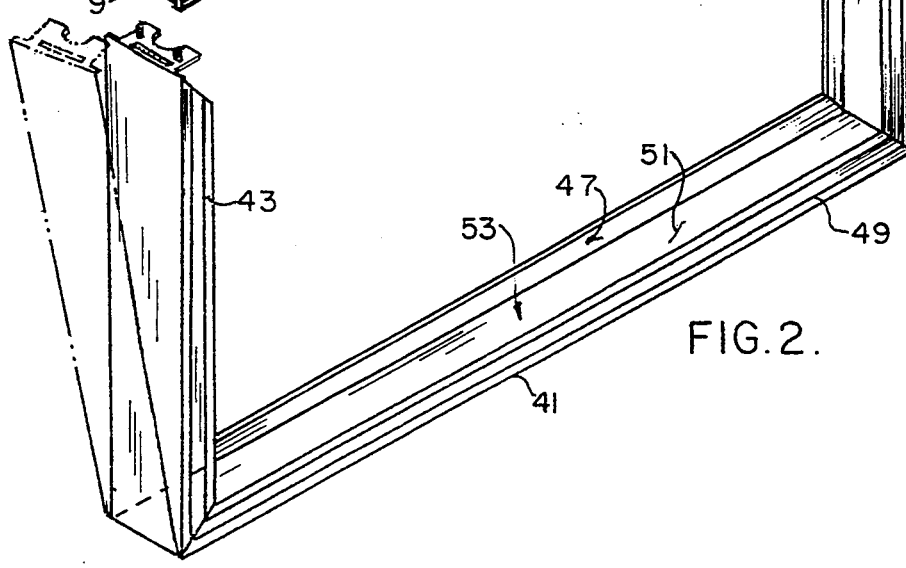
FIG.2.

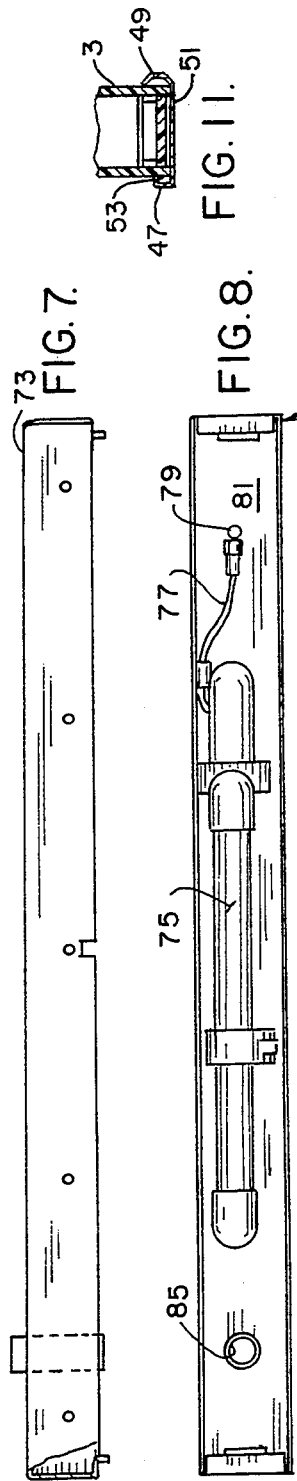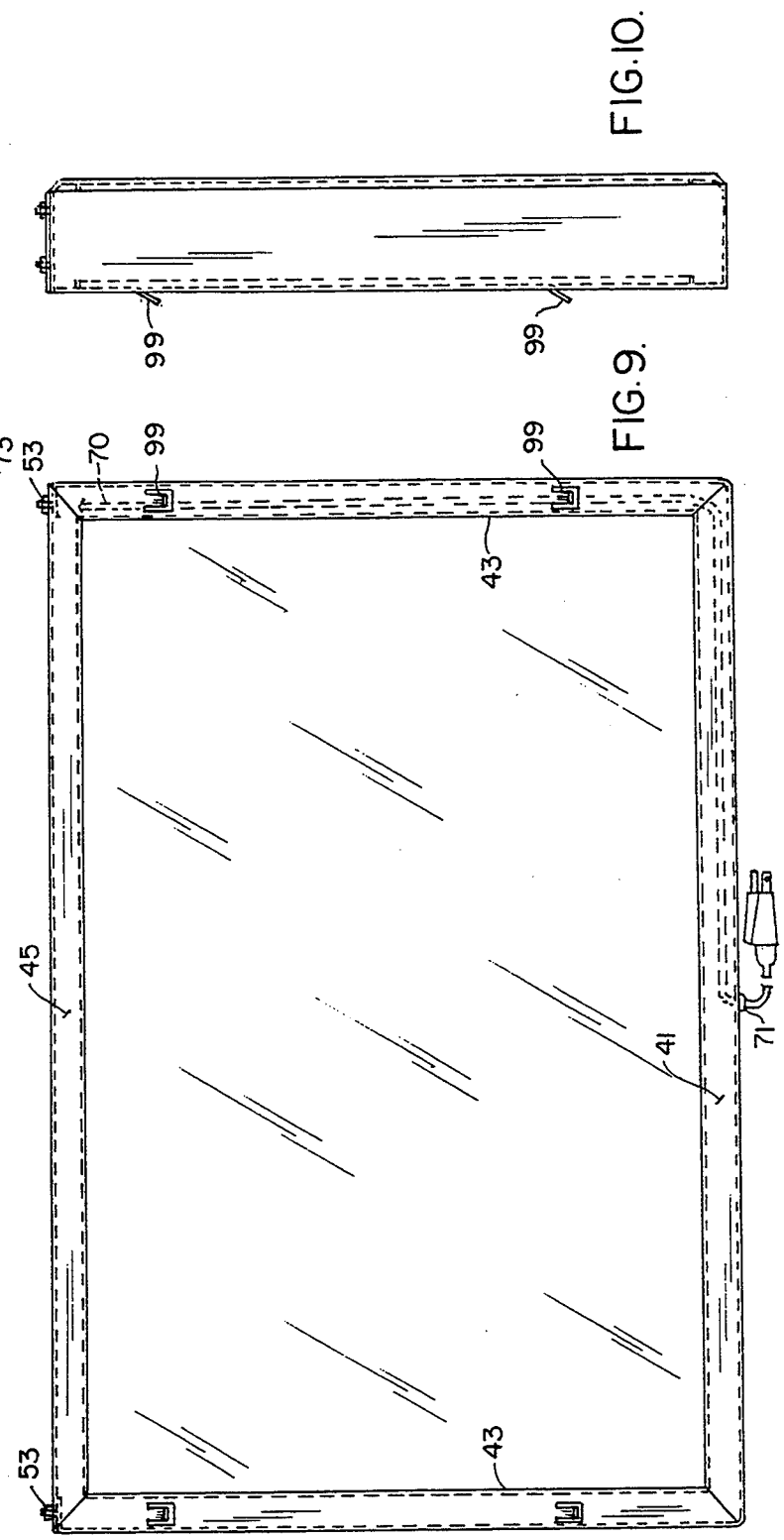

WALL MOUNTED AQUARIUM WITH INTEGRAL TANK

BACKGROUND OF THE INVENTION

This invention relates to aquariums, and, in particular, to wall mounted aquariums.

Many people like to have fish in their homes, apartments, offices or commercial establishments. Standard, table mounted aquariums often take up a significant amount of space, more than many people have in their facilities. Where there is insufficient room for a table top aquarium, or just for aesthetic purposes, aquariums may be mounted on a wall. Prior wall mounted aquariums, however, have been complex, did not allow for easy access to the tank for cleaning, and have not provided strong mounts to securely mount the aquarium to the wall. Because water is heavy, such strong mounts are needed. Also, they did not take into consideration the commercial aspects of the aquarium.

SUMMARY OF THE INVENTION

One object of this invention is to provide a wall mounted aquarium.

Another object is to provide such an aquarium which is simple to assemble.

Another object is to provide such an aquarium which is simple to mount on a wall.

Another object is to provide such an aquarium which may be easily taken down from the wall for cleaning.

Another object is to provide an aquarium which may be securely mounted to the wall, and incorporate advertising display.

These and other objects will become apparent to those skilled in the art in light of the following disclosure and accompanying drawings.

Briefly stated, a wall mounted aquarium of the present invention includes a tank supported in a frame and brackets for removably mounting the frame and tank to a wall. The frame has a first unitary part defining a bottom member and side members and a second part defining a a top member. The frame members are generally C-shaped to define a groove sized to receive the tank. The tank, which is of integral formation, is vertically slideably receive the tank in the grooves of the first part and the frame top member is then placed over the tank and secured to the side members. The frame side members each have at least one downwardly and outwardly projecting tab. The wall brackets are fixably mountable to a wall and include a pair of rearwardly extending legs joined by a web. The web defines openings which slidably and removably receive tabs formed in the frame side members to removably mount the wall mounted aquarium to a wall. A cover housing a light is fitted over the frame top member to give the aquarium a finished appearance.

BRIEF DESCRIPTION OF THE DRAWINGS

FIG. 1 is a partially exploded view of a wall mounted aquarium of the present invention;

FIG. 2 is an exploded view of the aquarium's tank and frame;

FIG. 7 is a back elevational view of a cover of the wall mounted aquarium;

FIG. 8 is a bottom plan view of the cover;

FIG. 9 is an back elevational view of the frame of the wall mounted aquarium;

FIG. 10 is a side elevational view of the frame;

FIG. 11 is a cross-sectional view of the wall mounted aquarium taken along line 11—11 of FIG. 1; and FIG. 12 is a cross-sectional view taken along line 12—12 of FIG. 1.

DESCRIPTION OF THE PREFERRED EMBODIMENT

Figure 3:
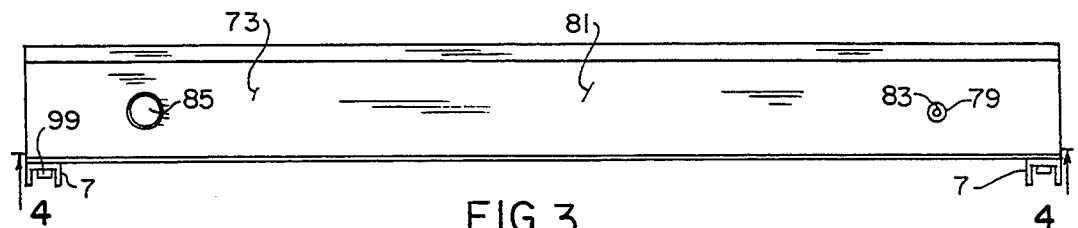
FIG. 3 is a top plan view of the wall mounted aquarium.

Referring now to the FIG. 1, reference numeral 1 indicates one illustrative embodiment of a wall mounted aquarium of the present invention. Wall mounted aquarium 1 includes a tank 3 held in a frame 5. Brackets 7 are used to mount the frame and tank to a wall.

Figure 4:
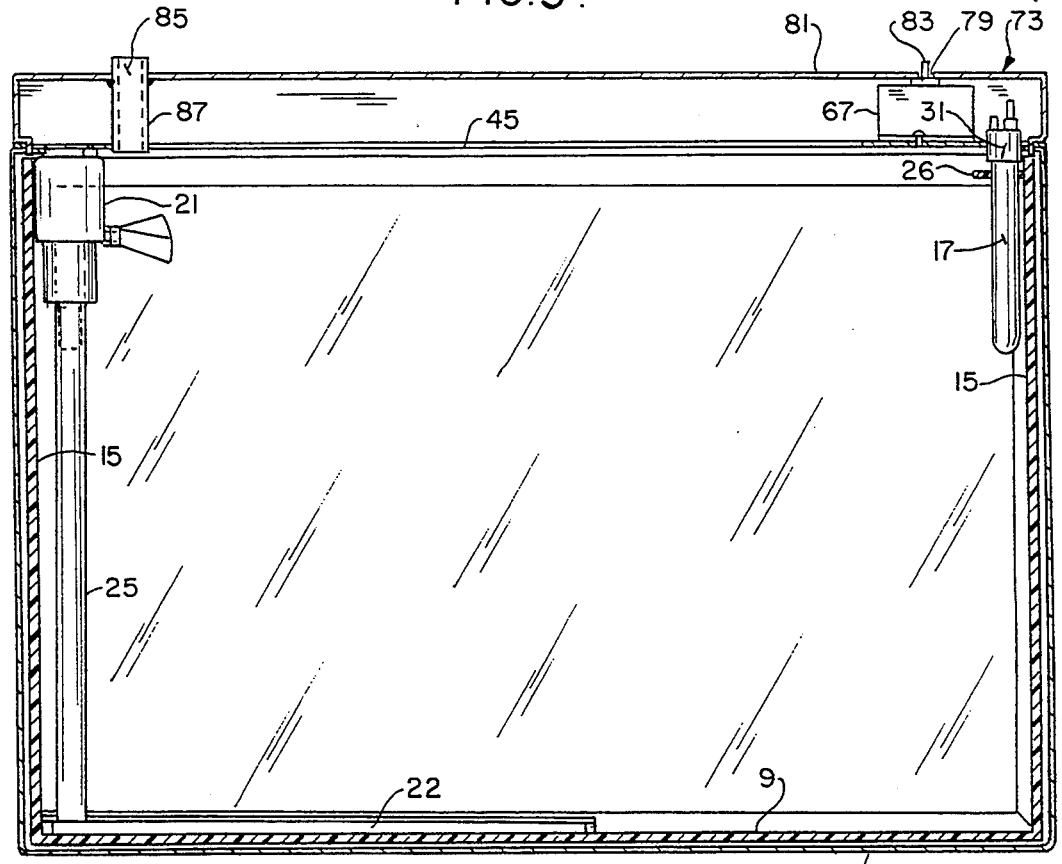
FIG. 4 is a cross sectional view of the wall mounted aquarium.
Figure 5:
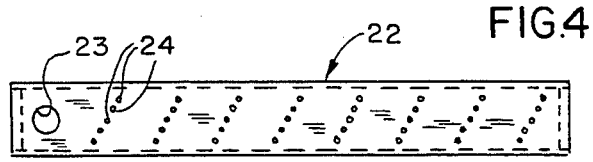
FIG. 5 is a top plan view of an aerator of the aquarium.
Figure 6:
FIG. 6 is a side elevational view of the aerator.

Tank 3 is made of a bottom 9, a front wall 11, a back wall 13, and side walls 15. The bottom and front, back, and side walls are joined together in a manner well known to provide a water tight and integrally formed enclosure which may hold water and fish. At least the front wall 11 of the tank is made of a transparent material, such as acrylic. Preferably, the whole tank is made of transparent material, such as acrylic. The tank includes a heater 17 and a filter 19. Filter 19 includes a pump 21 located at the top of the tank, an aerator 23 located on the bottom of the tank, and a pump tube 25 extending between the pump and the aerator. As seen in FIGS. 1 and 4, aerator 23 spans the depth of tank 3 and extends about half the length of the tank. It includes an opening 23 which receives tube 25 to connect the aerator 22 to pump 21 and a plurality of holes 24 through which air is injected to aerate the tank's water. Holes 24 are preferably arranged in a pattern forming a plurality of parallel diagonal lines.

Heater 17 is supported in tank 3 by a bracket 26. Bracket 26 consists of a shelf 27 extending inwardly from one of the tank's side walls 15. Shelf 27 defines a hole 29 through which the heater extends. The heater has a head 31 having a diameter larger than the diameter of the hole. The head thus rests on the shelf to prevent the heater 17 from passing through the hole 29.

As best seen in FIG. 2, frame 5 includes a bottom member 41, side members 43, and a top member 45. Bottom member 41 and side members 43 are preferably generally U-shaped, as shown in FIG. 11. They have an inner wall 47 and an outer wall 49 joined by a web 51 to define a groove 53. Groove 53 is sufficiently wide to receive tank 3. The outer or back wall 47 of the frame has a generally planar outer surface. The front or inner wall 47, however, preferably has a beveled top and bottom, as best shown in FIGS. 11 and 12, to give the front of the frame an ornamental, aesthetically pleasing appearance. The bottom and side members of frame 5 can be separate pieces which are joined together, but are preferably formed as one piece. The inner and outer members of the walls 47 and 49 are beveled at their edges so that the members may be joined at right angles to form a rectangular frame.

Frame side members 43 have short inwardly extending shelves 51 which have upwardly extending screws 53. The top member 45 is also generally U-shaped and fits over the tank. Top member 45 is secured to the side members 43 by screws 53. Top member 45 has screw holes 54 formed at its ends. Screws 53 pass through holes 54 and bolts or nuts are threaded over the screws to hold the top member in place.

Top member 45 is partially open, as at 55. Opening 55 extends from a point near the right side of the top (as seen in FIGS. 1 and 2) to a point abort two-thirds to three quarters of the way across the top. This opening allows for air to be introduced into the tank 3. It also allows for the feeding of the fish in the tank. The right side of the opening 55 is enlarged to define a square opening 56. Pump 21 is positioned below, and accessible through, opening 56. A cover 57, which is preferably translucent, partially closes opening 55 and extends from the left of side of the hole 55 towards opening 56. The cover 57 leaves part of the opening 55 open so that food and air may be introduced into tank 3.

As best seen in FIG. 12, cover 57 has a bottom arm 58 which defines a groove 59 with the top of cover 57. Groove 59 receives the surface of web or frame top member 45. Above groove 59, a pair of walls 60 extend upwardly from the top of cover 57 to define a groove 61. Groove 61 extends the length of cover 57 and receives the chord 62 which extends from pump 21 to power supply 58. Groove 61 thus prevent the cord 62 from falling into the water which is held in tank 3. Opposite of arm 58, an arm 63 extends downwardly from cover 57 slightly inwardly from front edge of the cover. Arm 63 functions as a stop to prevent excess forward movement of cover 57. Excess forward movement of the cover could disengage groove 59 from the frame member 45, allowing the cover to fall into the tank. Preferably, the front cover is wider than opening 55 so that it may support itself. If not, an extender 64 may be placed on the forward edge of hole 55. Extender 64 extends inwardly sufficiently to support the forward edge of cover 57. Extender 64 is preferably generally C-shaped and has teeth 65 which frictionally engage frame member 45 to secure the extender in place. Extender 64 also serves to brace tank 3 in frame 5 so that the tank will not move with respect to the frame.

The left side of the top 45 (as seen in FIGS. 1 and 2) defines a shelf 66 which supports a power supply 67. This power supply and all of its electrical connectors are removable to allow for easy replacement in the event that maintenance becomes necessary. Power supply 67 is secured in place on shelf 66 by screws 68 which extend into screw holes 69 of frame top member 45. Power supply 67 has an electrical cord 70 which allows the power supply to be connected to an electrical outlet. Cord 70 is received within the frame members so as to not be exposed. The cord exits through a port 71 in bottom frame member 41. (FIG. 9) The heater and pump, which are both electrically operated, are connected to the power supply by ports or outlets in the power supply. The use of the ports allows for the heater, pump, and light to be separately connected, or disconnected should any part need to be replaced. It also eases the assembly of the tank aquarium.

A cover 73 sits on top of top frame member 45 to cover the screws 53, power supply 67 and related electrical cord. Cover 73 is preferably an open rectangular box, as seen in FIG. 8 and houses a light 75. Light 75 has a cord 77 which is connected to the power supply. An opening 79 is formed in the top 81 of cover 73. A push button 83 of power supply 67 extends through opening 79 so that the light may be turned on and off. A second opening 85 is formed in a tube 87 which is extends upwardly from cover top 69. Tube 85 is positioned above frame top opening 57 so that food may be introduced into the tank to feed the fish.

Brackets 7 are generally U-shaped bars having a web 91 and two rearwardly extending legs 93. A pair of screw holes 95 are formed in each bracket. One screw hole is formed near the top of the bracket and the other is formed near the bottom. Screw holes 95 receive screws to mount the brackets to a wall. Each bracket also has at least one opening 97 formed along its length. Preferably there are two such openings spaced apart along the length of the bracket. Each side member 43 of frame 5 has downwardly and outwardly extending tabs 99 (FIGS. 9 and 10) spaced apart a distance equal to the spacing between bracket holes 97. Tabs 99 are formed integrally with frame side members 43 and support the frame and tank on the brackets 7 to mount the wall mounted aquarium 1 to a wall. The brackets 7 allow for the aquarium to be removably mounted to the wall so that the aquarium may be taken down for periodic cleanings.

To assemble the wall mounted aquarium 1, the tank 3 is simply placed into the grooves 53 defined by the bottom 41 and side 43 members of frame 5. Because the frame side members 43 have the top shelves 51, one of the sides 43 has to be moved out of the way, as shown in FIG. 2 in phantom, to allow the tank 3 to be positioned in the frame. The movement required, however, is minimal, and will not affect the integrity of the frame if not moved too often or too far. The top member 45 is then secured in place and cover 73 is positioned on the top member. With the brackets 7 positioned on a wall spaced apart a distance equal to the spacing between frame side members 43, the frame tabs 99 are slipped into the bracket holes 97. As can be appreciated, the present invention provides a wall mounted aquarium which is easily assembled and hung on a wall. Further, the interaction between the frame and bracket allow for the aquarium to be easily removed from the wall without difficulty. Also, the brackets provide a strong and secure mounting which will support the weight of the tank when filled with water. Also, it may be desirable to insert an advertising display behind the tank 3, and within the frame 5, to furnish a useful commercial contribution to this overall aquarium.

Variations, within the scope of the appended claims, may be apparent to those skilled in the art. The foregoing disclosure is thus intended to be only illustrative and not limiting.

I claim:

1. A wall mounted aquarium including:
   a tank having a bottom, a front wall, a back wall, side walls, and an open top, at least said front wall being made of a transparent material;
   a frame having a bottom member, side members, and a top member, said bottom and side members being generally C-shaped to define a groove sized to receive said tank, said bottom and side members being joined together to vertically slideably receive said tank in said groove, said frame top fitting over said tank;
   wall brackets which are fixably mountable to a wall, said brackets receiving said frame to secure said wall mounted aquarium to a wall;
   said tank houses a heater, a light, and an aerator, said aerator including a pump position near the top of said tank, a filter positioned at the bottom of said tank, and a tube connecting said pump and said filter;

said frame side members each have at least one downwardly and outwardly projecting tab, said wall brackets defining openings which receive said tabs, said wall brackets slideably and removably receiving said frame side members to removably mount said wall mounted aquarium to a wall;

said bottom and side frame members are made as an integral unit, said side members including means for attaching said top member thereto, said top member attaching means includes a shelf which extends inwardly from each of said frame side members at the tops thereof, said shelves each including at least one upwardly extending fastener, and said top frame member having a top surface defining openings which receive said fasteners.

2. The wall mounted aquarium of claim 1 including a cover, said cover housing a light, said cover being sized to sit on said frame top member.

3. The wall mounted aquarium of claim 1 wherein said fasteners are screws.

4. The wall mounted aquarium of claim 1 wherein said top frame member top surface defines a longitudinal opening.

5. The wall mounted aquarium of claim 4 wherein said longitudinal opening extends from a first point substantially adjacent an end of said top frame member to a second point spaced from a second end of said top frame member; the distance between said top frame member second end and said second point defining a shelf.

6. The wall mounted aquarium of claim 5 wherein said longitudinal opening includes an enlarged portion near said first point.

7. The wall mounted aquarium of claim 6 wherein said pump is positioned beneath said enlarged portion of said longitudinal opening.

8. The wall mounted aquarium of claim 6 including a power supply mounted to said top frame member shelf, said power supply including an electrical cords to connect said power supply to an electrical outlet, said power supply including ports for connecting electrical cords from said pump, said heater, and said light to said power supply.

9. The wall mounted aquarium of claim 8 wherein said power supply cord is received in said grooves of said frame members and exits said frame members through a port in one of said frame members.

10. The wall mounted aquarium of claim 9 wherein said port is located in said bottom frame member.

11. The wall mounted aquarium of claim 8 including a cover which covers at least a part of said top frame member longitudinal opening.

12. The wall mounted aquarium of claim 11 wherein said cover defines a channel on an upper surface thereof, said channel receiving an electrical cord extending from said pump to said power supply.

13. A wall mounted aquarium including:

a tank having a bottom, a front wall, a back wall, side walls and an open top, at least said front wall being made of a transparent material;

a frame having a first unitary part defining bottom member and side members of said frame and second part defining a top member to said frame, said frame members being generally C-shaped to define a groove sided to receive said tank, said first unitary part vertically slideably receiving said tank in said groove, said frame side members each hae at least one downwardly and outwardly projecting tab, said frame top fitting over said tank and being secured to said frame side members;

said bottom and side frame members are made as an integral unit, said side members including means for attaching said top member thereto, said top member attaching means includes a shelf which extends inwardly from each of said frame side members at the top thereof, said shelves each including at least one upwardly extending fastener, said top frame member having a top surface defining openings which receive said fasteners;

wall brackets which are fixably mountable to a wall, said brackets receiving said frame to secure said wall mounted aquarium to a wall; said wall brackets including a pair of rearwardly extending legs joined by a web, said web defining openings which slideably and removably receive said frame side members tabs to removably mount said wall mounted aquarium to a wall; and a cover, said cover being sized to sit on said frame top member.

14. The wall mounted aquarium of claim 13 including an advertising display provided behind the back wall of the tank and within the frame for furnishing a display viewable through the tank from the front wall side of the aquarium.

* * * * *